(12) United States Patent
Slovencik et al.

(10) Patent No.: US 10,997,681 B2
(45) Date of Patent: May 4, 2021

(54) METHOD AND APPARATUS FOR CUSHIONING AT LEAST ONE OBJECT IN A CONTAINER

(71) Applicant: Storopack Hans Reichenecker GMBH, Metzingen (DE)

(72) Inventors: Jean-Marc Slovencik, Uhrwiller (FR); Paul Deis, Preuschdorf (FR)

(73) Assignee: Storopack Hans Reichenecker GMBH, Metzingen (DE)

( * ) Notice: Subject to any disclaimer, the term of this patent is extended or adjusted under 35 U.S.C. 154(b) by 0 days.

(21) Appl. No.: 16/480,192

(22) PCT Filed: Jan. 15, 2018

(86) PCT No.: PCT/EP2018/050842
§ 371 (c)(1),
(2) Date: Jul. 23, 2019

(87) PCT Pub. No.: WO2018/137951
PCT Pub. Date: Aug. 2, 2018

(65) Prior Publication Data
US 2019/0385263 A1    Dec. 19, 2019

(30) Foreign Application Priority Data

Jan. 24, 2017    (DE) .................... 10 2017 101 324.5

(51) Int. Cl.
*G06Q 50/28* (2012.01)
*B65B 55/20* (2006.01)
(Continued)

(52) U.S. Cl.
CPC ............. *G06Q 50/28* (2013.01); *B65B 55/20* (2013.01); *B65B 57/04* (2013.01); *G06K 7/10435* (2013.01); *G06K 7/10445* (2013.01)

(58) Field of Classification Search
CPC ........ G06Q 50/28; B65B 57/04; B65B 55/20; G06K 7/10; G06K 7/10009;
(Continued)

(56) References Cited

U.S. PATENT DOCUMENTS

| 5,829,231 A * | 11/1998 | Harding ............... B31D 5/0047 53/493 |
| 2009/0082187 A1* | 3/2009 | Cheich ................... B65D 81/03 493/350 |

FOREIGN PATENT DOCUMENTS

WO    WO-2006017602 A1 *    2/2006    ........... B65B 65/003

OTHER PUBLICATIONS

Bizerba, Automatic volume recording of packages Dimensioning, weighing and scanning, Nov. 3, 2008. (Year: 2008).*

(Continued)

*Primary Examiner* — Brian Wilson
(74) *Attorney, Agent, or Firm* — Wood Herron & Evans LLP

(57) ABSTRACT

A device (30) is used to cushion at least one object (12*a*) in a container (10*a*). According to the invention, the device comprises: an automatic reading device (32) for reading an item of information which is present on the container (10*a*) and relates to a predetermined amount of cushioning material (28*a-c*) for a predefined combination of container (10*a*) and object (12*a*); a cushioning material provisioning device (38) for providing cushioning material (28*a-c*); and a control device (36) which receives a signal, based on the item of read information, from the automatic reading device (32) and initiates supply of the corresponding cushioning material (28*a-c*).

5 Claims, 5 Drawing Sheets

(51) Int. Cl.
*B65B 57/04* (2006.01)
*G06K 7/10* (2006.01)

(58) Field of Classification Search
CPC ........... G06K 7/10366; G06K 7/10415; G06K 7/10425; G06K 7/10435; G06K 7/10445
See application file for complete search history.

(56) References Cited

OTHER PUBLICATIONS

PCT/EP2018/050842, Written Opinion, dated Jan. 15, 2018.
"Dimensionieren, Wiegen und Scannen", Nov. 3, 2008 (Nov. 3, 2008), XP055771789, Gefunden im Internet: URL: https://automationapraxis.industrie.de/allgemein/dimensionieren-wiegen-und-scanned/ [gefunden am Feb. 3, 2021]

\* cited by examiner

METHOD AND APPARATUS FOR CUSHIONING AT LEAST ONE OBJECT IN A CONTAINER

The invention relates to a method and a to device for cushioning at least one object in a container, according to the preamble of the two subordinate claims.

Both from the market, as well as from the patent publications DE 10 2012 222 805 B3 and DE 10 2012 218 679 A1, it is known that objects present in a container, for example in a packaging box, which are to be transported in the container, are cushioned by means of crumpled paper. The crumpled paper forms a cushion pad and is produced from a web-shaped raw material in a cushion shaping device.

After the production, the cushion pad or the cushion pads is/are put into the container by a person ("packer"). The number and length of the cushion pads are determined by the packer during the production, wherein the determination is based on an estimation by the packer of the void volume present in the container. It is also known from the market that the void volume in a container is detected by means of a sensor device, and that the cushioning material is produced depending on the void volume detected. The US 2009/0082187 A1 describes a device for cushioning at least one object in a container.

It is an object of the present invention to create a method and a device of the type mentioned at the outset, which are very simple.

According to the invention, this object is achieved by a method and a device having the features of the subordinate claims. Advantageous developments of the invention are specified in subclaims. In addition, essential features for the invention can also be found in the following description and in the attached drawings, wherein these features can be essential for the invention, whether alone or in different combinations.

According to the invention, it is proposed that a method for cushioning at least one object in a container comprises the following steps: (a) creating a machine-readable information carrier, which receives information related to a predetermined quantity (defined, for example, by number, length, other dimensions, etc.) of cushioning material for a predefined combination of container and object; (b) attaching the machine-readable information carrier to a container; (c) feeding the container with the object accommodated therein to an automatic reading device for the information carrier; (d) reading the information by means of the automatic reading device; (e) transmitting a signal, which is based on the read information to a cushioning material provisioning device; and (f) providing the cushioning material based on the transmitted signal.

According to the invention, it is further proposed that the device for cushioning at least one object in a container comprises the following: an automatic reading device for reading the information present on the container, related to a predetermined amount of cushioning material for a predefined combination of container and object; a provisioning device for providing cushioning material; and a control device receiving a signal from the automatic reading device, wherein the signal is based on the read information, and transmits a corresponding signal to the provisioning device.

According to the invention, it was identified that numerous packaging scenarios are identical. A packaging scenario is characterized by a predefined combination of container and object. The same object is usually arranged and transported in the same container. An example is a computer screen. A certain computer screen (which is usually arranged in its own package as it is) has always the same external dimensions and can therefore always be transported or shipped in the same container, which has always the same dimensions, or it can be transported in different containers, wherein the void volume between the computer screen and the respective container then depends on the container.

According to the invention, it was also identified that identical cushioning materials can also be used in identical packaging scenarios. Therefore, the invention suggests that the required amount of cushioning material is determined in advance for predefined packaging scenarios. The "amount" of cushioning material can be defined by the number of individual cushioning materials and/or their size. For example, the predefined quantities of cushioning material and the corresponding packaging scenarios (object+container) are stored in a database.

If a certain object is now arranged in a certain container, for example, the amount of cushioning material corresponding to this packaging scenario is attached to the container from the database mentioned as information in a machine-readable information carrier, i.e. readable without the intervention of a user. Afterwards, the container with the object contained therein is fed to an automatic reading device for the information carrier, which automatically reads the information related to the required amount of cushioning material. Based on that, a signal is generated which, in a cushioning material provisioning device, results in providing the required amount of cushioning material. Thereby, the required amount of cushioning material can be produced on site.

Therefore, it is no longer necessary for a person to estimate the void volume in the container and provide the required amount of cushioning material based on the estimate. Nor is it necessary to use complex scanning devices to detect the void volume and supply the required amount of cushioning material based on this detection. Instead, reading the information by means of the automatic reading device is sufficient to supply the amount of cushioning material required for the respective packaging scenario. This simplification saves considerable expenses on the plant side. In addition, a low-skilled person can also be employed, which also saves staff costs. This ensures optimum cushioning of the object in the container.

A development of the method according to the invention is characterized by the fact that in step (a) as an information carrier a barcode is created and in step (d) a barcode is read, or that in step (a) the information is stored on an RFID tag and in step (d) the RFID tag is read. Both, a barcode and an RFID tag are robust and inexpensive information carriers. The barcode can be printed on a label first and then adhered to the container, or printed directly on the container. The advantage of an RFID tag is that it can also be simply inserted into the container.

It is particularly advantageous if a cushioning material made of crumpled paper is supplied in step (f) of the method according to the invention. Crumpled paper is resource-saving and can be very easily supplied on site by means of a cushion shaping device which reshapes a plate-shaped raw material into crumpled cushions. The web-shaped raw material can either be rolled up on a roll or, for example, folded in a zigzag shape as flat material.

In particular, for crumpled paper cushion pads produced on site, step (a) may define the amount of crumpled paper by a number and/or length of individual crumpled paper cushion pads. This is very easy to implement.

In another development, it is proposed that at least two cushion pads of different lengths should be provided in step (f). This allows very individual packaging scenarios to be served, i.e. objects in a container can be effectively cushioned.

It is particularly advantageous for a device according to the invention if the provisioning device is a mobile device. Flexibility in the use of the device according to the invention is thereby increased.

An embodiment of the invention is explained below with reference to the attached drawings. In the drawings.

Figure 1:
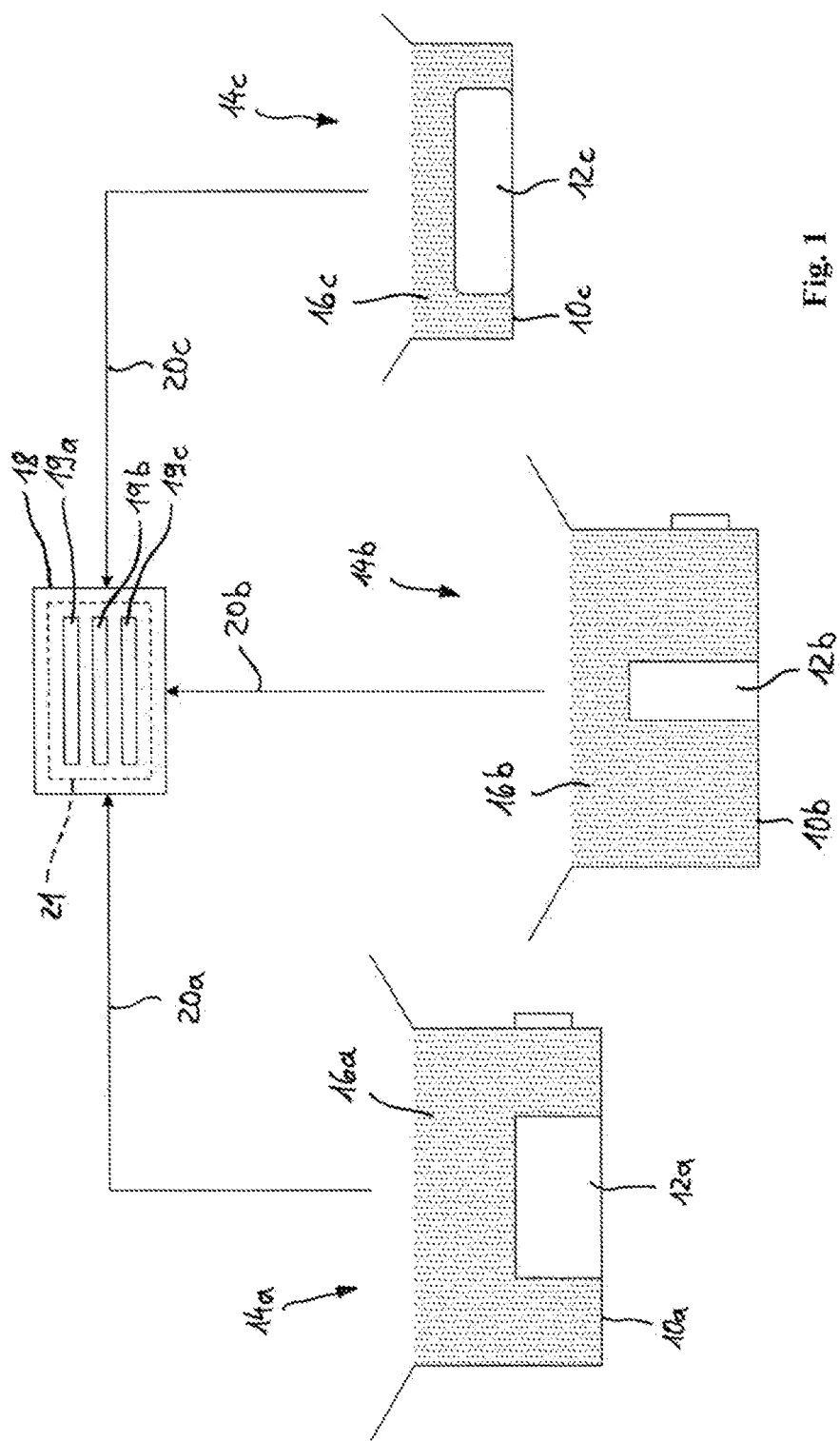
FIG. 1 is a schematic representation showing the previous determination of an amount of cushioning material for three different packaging scenarios.

The containers shown in FIG. 1 bear the reference signs 10a, 10b and 10c. These containers are, for example, containers made of cardboard material, such as those used by shipping companies to ship ordered items. Basically, however, the containers can also be made of plastics or another material. It can be seen that the containers 10a and 10b are identical, whereas the container 10c is wider and less high than the containers 10a and 10b.

An object 12a, 12b or 12c is arranged in each of the containers. Although only one single object 12a-c is drawn in each case, it is also conceivable that a plurality of objects can be arranged in a container 10a-c. It can be recognised that the objects 12a-12c drawn are different. The combination of container 10a-c and object 12a-c thereby defines a very specific packaging scenario 14a-c. This is characterized, among other things, by a certain individual size and also a certain individual distribution of a void volume 16a-c, shown in the drawing by a dotted line in the container 10a-c in which the object 12a-c is arranged.

For example, the size and distribution of the void volume 16a-c of the specific packaging scenario 14a-c can be transmitted via a sensor (not shown) to the control device 18, which is indicated by arrows 20a-c in FIG. 1. The control device 18 can, for example, be a standard PC. By means of the control device 18, the need for cushioning material is now determined, which is necessary to fill the individual void volume 16a-c for the respective packaging scenario 14a-c, in such a way that the object 12a-c is sufficiently secured against sliding in the container 10a-c, and is also sufficiently protected against damage from forces acting on the container 10a-c during transport.

In this case, as described in detail below, cushion pads made of a crumpled paper material are provided as the cushioning material. The control device 18 now determines for each of the packaging scenarios 14a-c how many cushion pads are required and how long these cushion pads must be. Thus the number and dimensions are determined, or expressed simply, the total amount of cushioning material required is determined.

The corresponding number and dimensions of cushion pads are assigned to each packaging scenario 14a-c, and a data set 19a-c is created for each packaging scenario 14a-c, which links the respective packaging scenario 14a-c with the number and dimensions of the cushion pads, and these data sets are stored in the storage 21 of the control device 18. All this is done in advance, i.e. outside the regular packaging of objects in corresponding containers.

Figure 2:
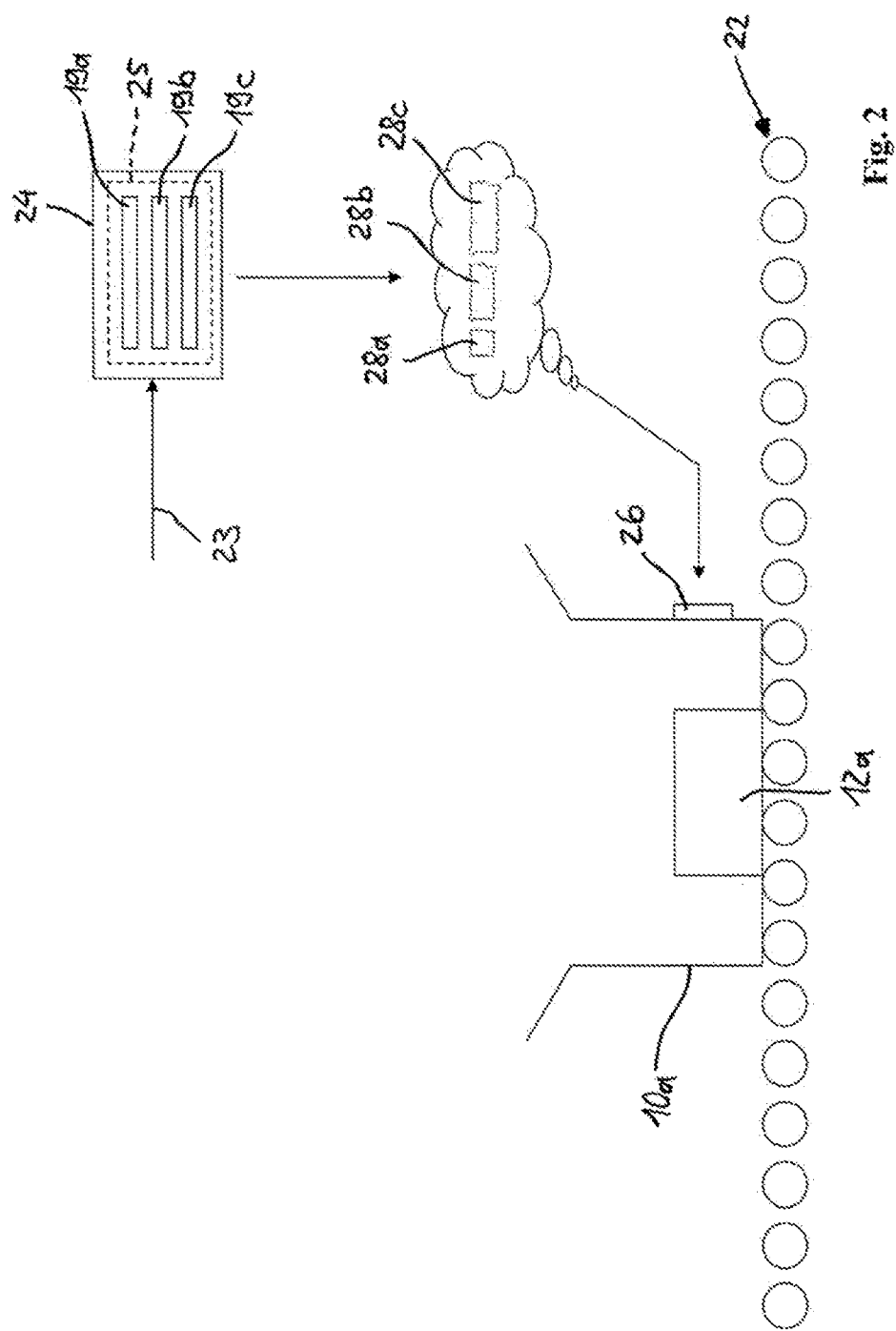
FIG. 2 is a schematic representation showing the provision of a container with information related to the first packaging scenario of FIG. 1.
Figure 3:
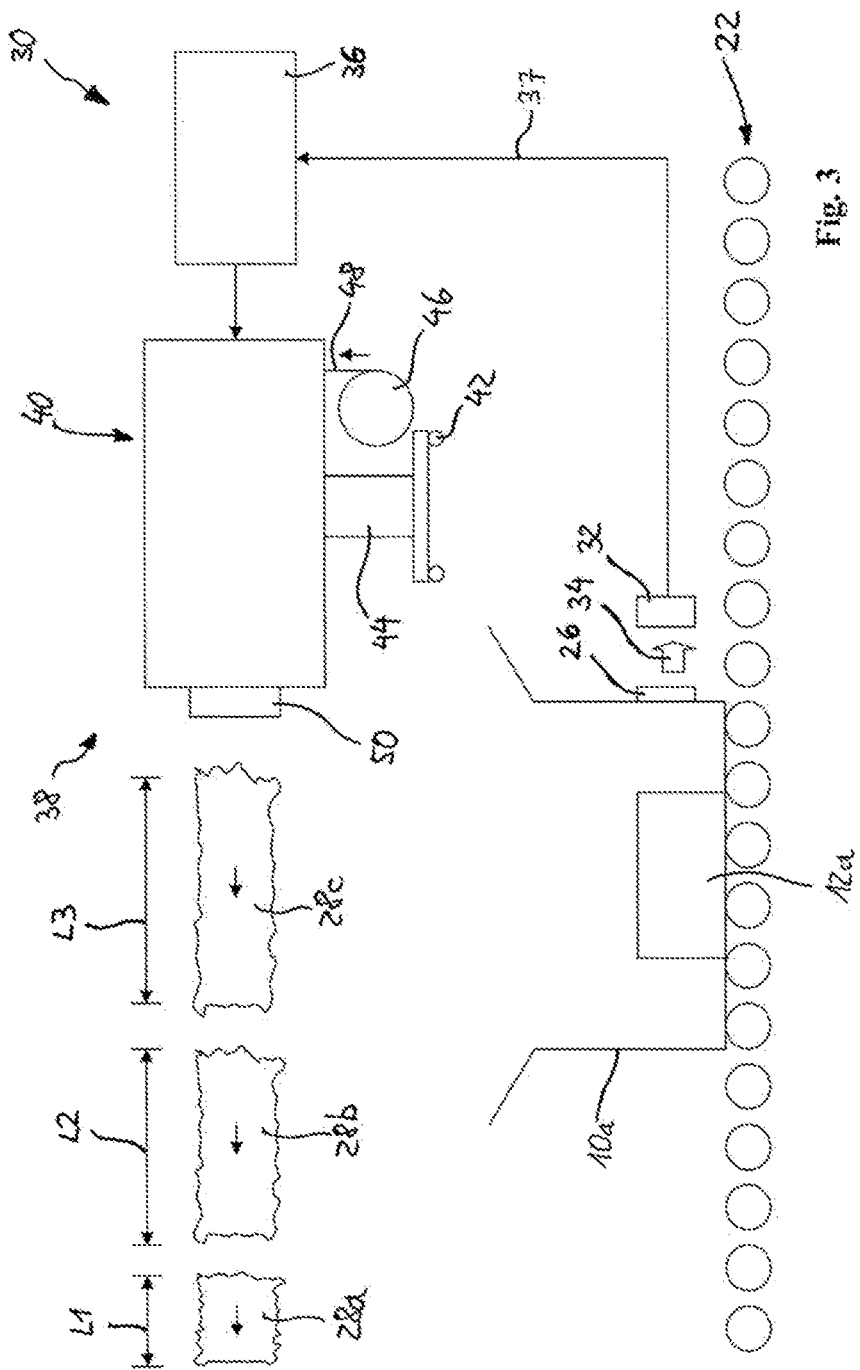
FIG. 3 is a schematic representation showing the supply of cushioning materials for the packaging scenario of FIG. 2.

It goes without saying that other cushioning materials can also be used, besides the cushion pads mentioned. For example, bags filled with air ("air bags"), bags filled with foam ("foam bags"), or loose-fill bags can also be used as cushioning material. In addition, a packaging scenario 14a-c does not necessarily have to be detected by means of a sensor. It is also possible for a person to determine the need for cushioning material, for example the number and dimensions of cushion pads made of crumpled paper, for a specific packaging scenario 14a-c by trial and error, for example, and to input this information via a keyboard (not shown) on the control device 18. In this way, the corresponding data set would be generated manually. Regular packaging of objects in containers is now explained by reference to FIGS. 2-4. First of all, it can be seen from FIG. 2 that a container 10a with an object 12a is transported on the roller conveyor 22. A person or a sensor (not shown) then evaluates which packaging scenario it is. In this case, the packaging scenario used is 14a. This is communicated to a control device 24, which may be a PC (arrow 23). The data sets 19a-c determined above by means of the control device 18, which concern the individual packaging scenarios 14a-c, have previously been read into a storage 25 of the control device 24.

Once it has been established that the packaging scenario 12a is present, a machine-readable information carrier 26 is generated by the control device 24 and attached to container 10a by a person or machine. The machine-readable information carrier 26 in this case comprises a self-adhesive label which has been printed with a barcode by means of a printer controlled by the control device 24. The barcode contains the information on the amount of cushioning material, i.e. the number and length of the cushion pads 28a, 28b and 28c to be used for cushioning, and it is the actual information carrier. This information was read from the data set 19a related to the packaging scenario 12a and stored in the control device 24.

It goes without saying that if it had been the container 10b with the object 12b, i.e. the packaging scenario 14b, the corresponding data set 19b would have been read. The same would apply to the packaging scenario 14c, and any other packaging scenario to which a corresponding data set is assigned in the storage 25. Further, while a bar code is specified as the information carrier in this case, other information carriers are also conceivable. A simple possibility for an information carrier is, for example, an RFID tag, which can be wirelessly written with the corresponding information and which, for example, could simply be inserted into the container 10a.

Via the roller conveyor 22, the container 10a is further transported to a station 30 in which the cushioning material, i.e. the cushion pads 28a-c, is provided (FIG. 3), and which, in this case, forms a device for cushioning the object 12a in the container 10a. The station 30 initially comprises an automatic reading device 32, which can read the information contained in the information carrier 26. This process is indicated by the arrow 34 in FIG. 3. The automatic reading device 32 transmits a signal to the control device 36. This transmission is indicated by the arrow 37. The transmitted signal is based on the read information from the information carrier 26 by the automatic reading device 32. As mentioned earlier, this information is the number and length of the cushion pads 28a-c to be provided.

The control device 36 belongs to a cushioning material provisioning device which is designated as 38 in total. Further, this cushioning material provisioning device 38 includes a cushion shaping device 40. The cushioning material provisioning device 38 may be stationary, but it may also be a mobile device. This is indicated by the fact that the cushion shaping device 40 comprises a stand 44, movable by means of rollers 42.

The control device 36 controls the cushion shaping device 40 in such a way that the three cushion pads 28a, 28b and 28c mentioned above are produced from a web-shaped paper raw material 48, which in this case is stored on a roll 46, by machine crumpling, and is supplied in this way (it goes without saying that the web-shaped paper raw material could also be stored as a zigzag-folded stack instead of on a roll). These cushion pads 28a-c differ in their length, which is L1 for the cushion pad 28a, L2 for the cushion pad 28b and L3 for the cushion pad 28c. The cushion pads 28a-c are delivered by the cushion forming device 40, via a machine output 50.

Figure 4:
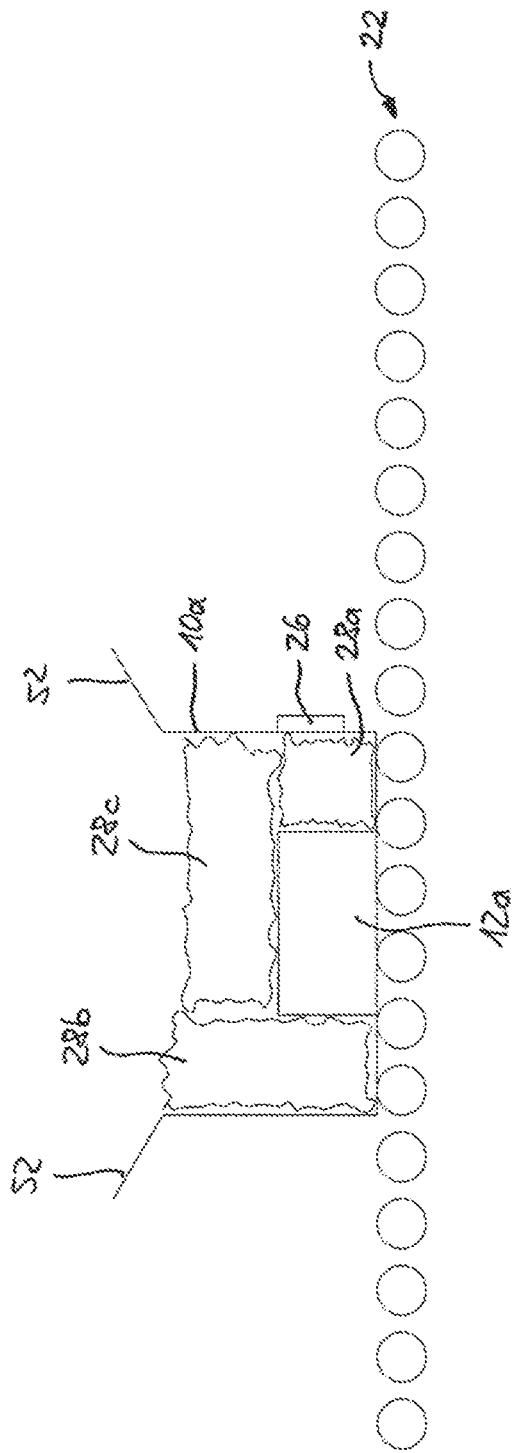
FIG. 4 is a schematic representation of the container, object and cushioning material of the packaging scenario of FIG. 2.

One person now takes the produced cushion pad 28a-c and places it, as shown in FIG. 4, in the void volume 16a in such a way that said volume is sufficiently filled and the object 12a is adequately protected both against slipping and against forces acting on the container 10a. The container 10a can now be closed by means of folding flaps 52 and transported.

Figure 5:
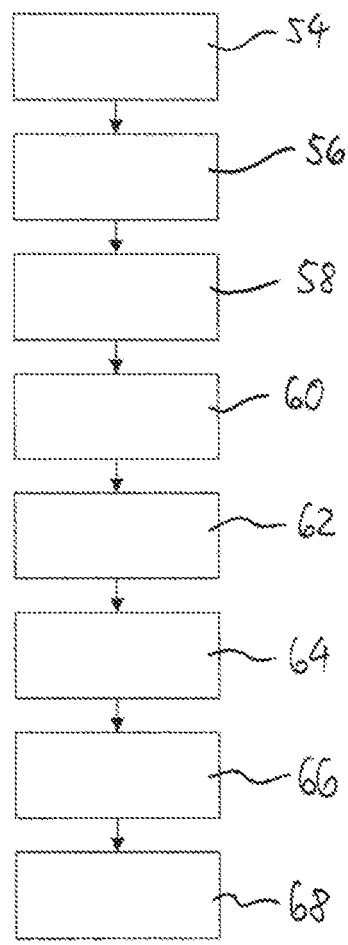
FIG. 5 is a flowchart of a method for cushioning of an object in a container.

Referring to FIG. 5, the method for cushioning the object 12a in the container 10a, already described above in connection with FIGS. 1-4, is now briefly explained again.

The method begins in a starting block 54. In 56, the machine-readable information carrier 26 is created in the form of a self-adhesive label with the barcode printed on it. The barcode contains the information related to the predetermined amount of cushion pads 28a-c for the packaging scenario 14a. In 58, the machine-readable information carrier 26 is attached to the container 10a. In 60, the container 10a with the object 12a inside is transported to the automatic reading device 32. In 62, the information contained on the adhesive label 46 is read by the automatic reading device 32.

In 64, the signal 37, based on the read information, is transmitted from the automatic reading device 32 to the cushioning material provisioning device 38. In 66, the cushioning material is finally supplied in the form of the three cushion pads 28a-c by the cushion shaping machine direction 40, based on the transmitted signal. The method ends at 68.

As mentioned earlier several times, an item of information is stored on the information carrier related to the amount of cushioning material required for cushioning an object in a container. It goes without saying that further items of information may also be stored on the information carrier, for example, related to the type of the cushioning material and/or the material of the cushioning material, as well as other important or useful information in the process of further handling of the container.

The invention claimed is:

1. A method for cushioning at least one article in a container, comprising at least the following steps:
   a. providing a plurality of data sets, wherein a respective one of said data sets associates one of a plurality of packaging scenarios with a quantity of cushioning material, wherein a respective one of said packaging scenarios characterizes a combination of a respective container and a respective at least one article to be packed in the respective container;
   b. placing the at least one article in the container;
   c. selecting, depending on the at least one article arranged in the container and depending on the container, one of the plurality of said data sets;
   d. determining, depending on the provided packaging scenarios, information about a quantity of cushioning material, wherein the information is provided by the selected data set;
   e. creating a machine-readable information carrier, which contains the determined information about the quantity of cushioning material;
   f. attaching the machine-readable information carrier to the container with the at least one article arranged therein;
   g. feeding the container with the at least one article arranged therein to an automatic reading device for the machine-readable information carrier;
   h. reading the information with the automatic reading device;
   i. transmitting a signal, which is based on the read information, to a cushioning material provisioning device; and
   j. providing the quantity of cushioning material based on the transmitted signal.

2. The method according to claim 1, wherein in the step (e) a barcode is generated as the machine-readable information carrier and in the step (h) the barcode is read, or in the step (e) the information is stored on an RFID tag and in the step (h) the RFID tag is read.

3. The method according to claim 1, wherein in the step (j) the cushioning material comprises crumpled paper.

4. The method according to claim 3, wherein in the step (e) the quantity of cushioning material is defined by a number and/or a length of individual cushion pads, comprising crumpled paper.

5. The method according to claim 4, wherein in the step (j) at least two cushion pads of different lengths are supplied.

* * * * *